J. Doering,
Water Filter,
N° 61,407. Patented Jan. 22, 1867
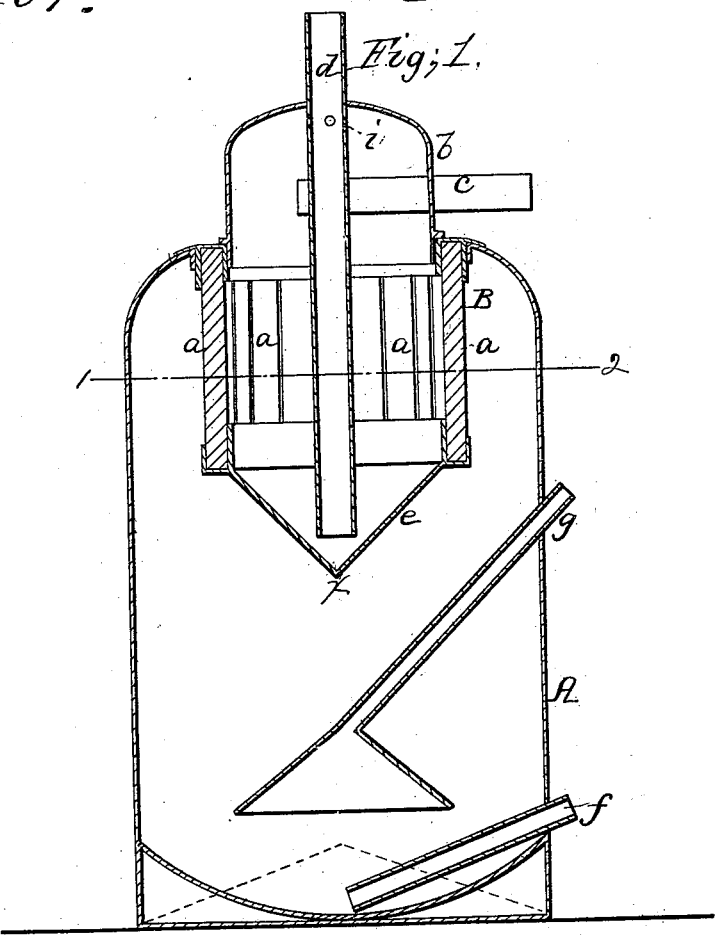
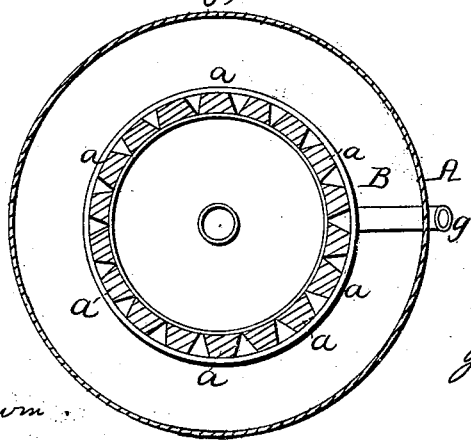
Witnesses;
John Parker
S. K. Hocsie Godum
Inventor;
J. Doering
By his attorney
Henry Howson

United States Patent Office.

JUSTUS DOERING, OF PHILADELPHIA, PENNSYLVANIA.

Letters Patent No. 61,407, dated January 22, 1867.

IMPROVEMENT IN FILTERS.

*The Schedule referred to in these Letters Patent and making part of the same.*

TO ALL WHOM IT MAY CONCERN:

Be it known that I, JUSTUS DOERING, of Philadelphia, Pennsylvania, have invented certain improvements in Filters; and I do hereby declare the following to be a full, clear, and exact description of the same, reference being had to the accompanying drawing, and to the letters of reference marked thereon.

My invention consists of certain vessels or casings, and pipes, constructed and arranged as fully described hereafter, so that water in passing through the casings will be thoroughly purified, and so that the impurities extracted from the water may be removed from the casings without opening the latter.

In order to enable others skilled in the art to make and use my invention, I will now proceed to describe its construction and operation. On reference to the accompanying drawing, which forms a part of this specification—

Figure 1 is a sectional elevation of my improved filter; and

Figure 2, a sectional plan on the line 1–2, fig. 1.

A is a casing, the bottom of which is concave, and in the top of this casing is secured a smaller detachable casing or vessel, B. The body of the vessel B consists of a series of vertical bars or blocks, $a\ a$, of glass, which are so arranged that their side edges shall be almost in contact with each other. The bottom $e$ of the vessel B is conical, and to the top is fitted a dome-shaped cap or cover, $b$, through which extends a horizontal pipe, $c$, and a vertical pipe, $d$. The lower part of the pipe $d$ is almost in contact with the lowest portion, $x$, of the bottom of the vessel B, and in the pipe near the top of the vessel are openings, $i\ i$, for a purpose described hereafter. Through the side of the casing A project two inclined tubes, $f\ g$, the former extending to the centre and almost touching the bottom of the casing, while the tube $g$ is flanged at its lower end, as shown in fig. 1. The outer ends of the tubes $f$ and $d$ are closed, and the water to be purified is introduced into the filter through the tube $c$. The heavier particles of matter carried with the water into the vessel B fall to the bottom of the latter, and collect at the lowest point, $x$, of the same, near the end of the tube $d$. The finer particles are separated from the water as the latter passes between the glass bars $a\ a$ into the casing A, while any fatty matters, or particles lighter than the water, rise to the surface of the latter near the top of the vessel B. Such particles of matter as may remain in the water after its introduction into the casing A collect in the centre of the concave bottom of the latter, while the cleansed water passes upwards into the tube $g$, and out of the latter into any suitable receptacle. When it is desired to cleanse the filter, the tubes $d$ and $f$ are opened, when the sediment which has collected at the bottom of the casings will pass into the lower ends of the tubes, and the lighter particles at the surface of the water will pass through the openings $i\ i$ into the tube $d$, and both will be discharged with the water as the latter passes from the filter. The bars or blocks $e\ c$ may be made of metal, porcelain, or other suitable material, or a perforated vessel made entirely of metal or porcelain may be substituted for a vessel, B, made as described. It will be seen that by the arrangement of vessels and pipes above described the sediment which collects in each vessel may be removed without opening the filter, and that the water which passes through the latter is quickly and thoroughly purified.

I claim as my invention, and desire to secure by Letters Patent—

1. The perforated vessel B, and its pipes $c$ and $d$, in combination with the casing A and its pipes $f$ and $g$, the whole being constructed and arranged substantially as specified.

2. An inclined discharge pipe, arranged in respect to the concave bottom of a filter, substantially as and for the purpose described.

3. The pipe $d$, with its openings $i$, in combination with a filter, substantially as and for the purpose set forth.

In testimony whereof I have signed my name to this specification in the presence of two subscribing witnesses.

JUSTUS DOERING.

Witnesses:
 CHARLES E. FOSTER,
 JOHN WHITE.